ന73-151
8/23/77   OR   4,043,191   SR

United States Patent [19]
Mills

[11] 4,043,191
[45] Aug. 23, 1977

[54] DYNANOMETER FOR A PUMP-OFF CONTROL

[76] Inventor: Manuel Dee Mills, 2808 Delano, Midland, Tex. 79701

[21] Appl. No.: 688,130

[22] Filed: May 20, 1976

[51] Int. Cl.² .............................................. G01L 5/04
[52] U.S. Cl. ........................................ 73/151; 73/143
[58] Field of Search ..................... 73/151, 141 A, 143, 73/141 R, 133 R

[56] References Cited
U.S. PATENT DOCUMENTS

| | | | |
|---|---|---|---|
| 1,094,904 | 4/1914 | Hughes | 73/141 A UX |
| 1,822,628 | 9/1931 | Lincoln | 73/141 R X |
| 2,767,578 | 10/1956 | Scarth | 73/151 X |
| 2,927,458 | 3/1960 | Moon, Jr. et al. | 73/141 A |
| 3,457,781 | 7/1969 | Elliott | 73/151 |

OTHER PUBLICATIONS
Brochure: W. C. Dillon and Co., Inc., Bulletin 49E, Received June 1960.

*Primary Examiner*—Jerry W. Myracle
*Attorney, Agent, or Firm*—Marcus L. Bates

[57] ABSTRACT

A dynamometer for measuring the tension in a pair of spaced, elongated members. The dynamometer includes a spring member having distal ends spaced from a medial portion, and a clamp means by which the distal ends are attachable to the elongated members to cause the elongated members to be moved in a biased manner towards one another. The distal ends of the spring member are therefore sprung apart in proportion to the tension of the elongated members.

A sensor means is connected to sense the change in magnitude of the sprung relationship of the distal ends respective to the medial portion of the spring member. A chart drive unit is mounted respective to the dynamometer for recording the cyclic change in the magnitude of the sprung relationship of the distal ends.

21 Claims, 16 Drawing Figures

DYNANOMETER FOR A PUMP-OFF CONTROL

DISCUSSION OF RELATED ART

Elliot, U.S. Pat. No. 3,457,781, discloses apparatus for measuring a load on a polish rod which supports a string of sucker rod and is associated with a pumpjack apparatus. The apparatus includes a dynamometer 11 having shims 14 and 16 and a deflection ring 21. The deflection ring is inserted between the polish rod clamp and carrier bar, and as stress is placed on the polish rod, the ring deflects proportional to the load on the polish rod, with the amount of deflection being recorded at 22. Montgomery et al, U.S. Pat. No. 3,838,597, employs a transducer to generate a signal representative of the load change in the pumping unit as the rod string is reciprocated. The transducer is located on the walking beam at 38.

Yew et al, U.S. Pat. No. 3,527,094, discloses a U-shaped platform 28 held on top of a hanger bar 23 and attached to the polish rod of a pumpjack unit. A load cell 33 generates a signal proportional to the weight of the rod string.

Weiss et al, U.S. Pat. No. 3,372,582, discloses a cable tension indicator device for determining the tension within a single elongated member.

Rogers, U.S. Pat. No. 2,324,174, discloses a weight indicator 20 for determining the tension within a line 14.

Hughes, U.S. Pat. No. 1,094,904, discloses a weight indicator in the form of a ring for determining the weight of a mass.

BACKGROUND OF THE INVENTION

This invention relates to a new dynamometer apparatus and specifically to a dynamometer for measuring the tension which exists within the bridle of a pumpjack unit. The tension within a string of sucker rod changes during each pumping cycle of a pumpjack unit associated with a pumpjack apparatus in a manner known to those skilled in the art. Dynamometers of the prior art are usually very expensive, and for this reason, the dynamometer is carried from one well to another, where it is removably connected by one means or another in such a manner that a sensing unit associated therewith measures the tension effected within the rod string. The value of the tension is usually recorded to provide a record of well performance.

Usually the pumpjack unit must be shut down and parts thereof repositioned so that the sensing unit can be interposed in such a manner that the measuring or sensing unit must carry the entire weight of the sucker rod string. This expedient enables the sensing unit to directly measure the rod string tension during each pumping cycle of the pump assembly.

Considerable loss in production is occasioned by the down time required in the installation and removal of the dynamometer respective to the sucker rod string. Moreover, the prolonged down time of the pumpjack unit necessitates the presence of a technician for another prolonged interval of time, because he usually is interested in analyzing the well characteristics until a "pump-off condition" is encountered. Accordingly, dynamometers of the prior art are not only expensive in initial cost, but the repeated use thereof is also expensive, because of the technician's time, as well as the loss of production.

Therefore, it would be desirable to have made available a dynamometer which is rugged in design, simple in operation, low in initial cost, and which can be rapidly attached to the pumpjack unit in such a manner that very little loss in production occurs. Furthermore, the time required for analyzing the well is considerably minimized.

SUMMARY OF THE INVENTION

This invention comprehends apparatus for measuring the tension in a pair of spaced, elongated members comprising a spring member having means associated therewith for attachment to said elongated members in such a manner that the spring member is distorted in a predictable and reproduceable manner in proportion to forceable bending movement of said elongated members towards and away from one another.

More specifically, the apparatus of the present invention comprises a spring member having distal ends spaced from a medial portion, clamp means by which said distal ends are attachable to said elongated members to cause one elongated member to be biased towards the remaining elongated member so that the distal ends are sprung towards or away from one another in proportion to the bending movement of said elongated members towards or away from one another.

In one embodiment of the invention, a sensing means is connected to sense a change in the magnitude of the sprung relationship of said distal ends respective to said midportion. The sensor means is utilized to drive a chart means, thereby providing a permanent record of the characteristics of the relative movement of one elongated member relative to the other. The spring member is of U-shaped configuration so that the distal ends are moved towards and away from one another in proportion to the tension in said spaced elongated members.

In another embodiment of the invention, the recorder means is removably connected to the spring member so that the latter can be more or less permanently mounted to said elongated members, and the recorder means rapidly and removably attached to the spring member whenever it is desirable to analyze the characteristics of the elongated members.

Accordingly, a primary object of the present invention is the provision of a spring member of U-shape configuration arranged to measure the tension within two spaced elongated members.

Another object of the invention is to provide a dynamometer which can be rapidly attached in a removable manner to the bridle of a pumpjack unit to thereby ascertain variations in the tension of a sucker rod string.

A further object of this invention is to disclose and provide improvements in a dynamometer for a pump-off control unit.

A still further object of this invention is the provision of a pump-off control unit comprising a spring member which biases the bridle of the pump-off unit towards or away from one another to thereby provide a signal which is proportional to the tension within the polish rod of the pumpjack unit.

Another and still further object of this invention is the provision of a method of determining the changes in tension within a polish rod during each pumping cycle of a pumpjack unit.

An additional object of the present invention is the provision of a measuring apparatus for determining variations in the tension of a sucker rod string each pumping cycle of a pumpjack unit.

Another object of the invention is to provide a new control system by which a pumping unit may be monitored in order to ascertain the pumping characteristics thereof.

A further object of this invention is to disclose and provide a system for monitoring the pumping action of a pumpjack unit associated with a downhole pump.

A still further object of this invention is the provision of a control unit for inactivating a pumpjack unit whenever a pump-off condition is encountered.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

DETAILED DESCRIPTION OF THE PREFERRED EMBODIMENTS

Throughout the various figures of the drawings, wherever it is practical or logical to do so, like or similar numerals will refer to like or similar objects.

Figure 1:
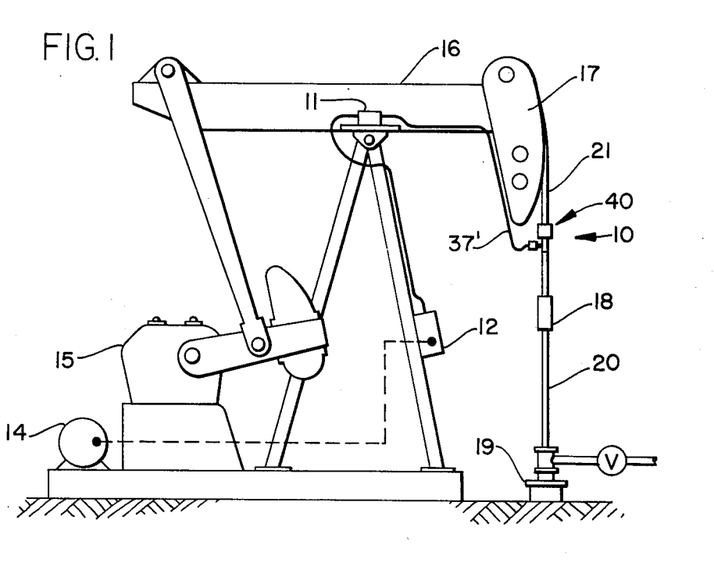
FIG. 1 is a part diagrammatical, part schematical illustration of a pumpjack unit having apparatus made in accordance with the present invention associated therewith.

FIG. 1 discloses a dynamometer apparatus 10 made in accordance with the present invention. The dynamometer is connected to the bridle of a pumpjack unit and to circuitry at 11 and 12, and controls a motor 14. The motor drives the usual gear box 15. A Sampson post is journaled to a rocking beam 16 so that the horsehead 17 imparts reciprocal motion into the bridle 21. The bridle is comprised of the usual pairs of spaced, elongated members in the form of spaced, parallel cables which support a single-tree 18. The single-tree supports a polished rod 20, which in turn is connected to the usual string of sucker rod (not shown). The polish rod sealingly extends through a packing gland and downhole into a wellbore 19 so that the pumpjack reciprocates the polish rod, which reciprocates the sucker rod, which in turn reciprocates a downhole pump, thereby enabling production of a wellbore to be carried out.

The dynamometer is illustrated as being connected at 37' to the circuitry 11 which is mounted to the crossbeam, as well as to circuitry 12, which is contained within a control box for controlling the prime mover 14. The specific details of the controls 11 and 12 are set forth in my previously issued U.S. Pat. No. 3,851,995.

Figures 2, 3:
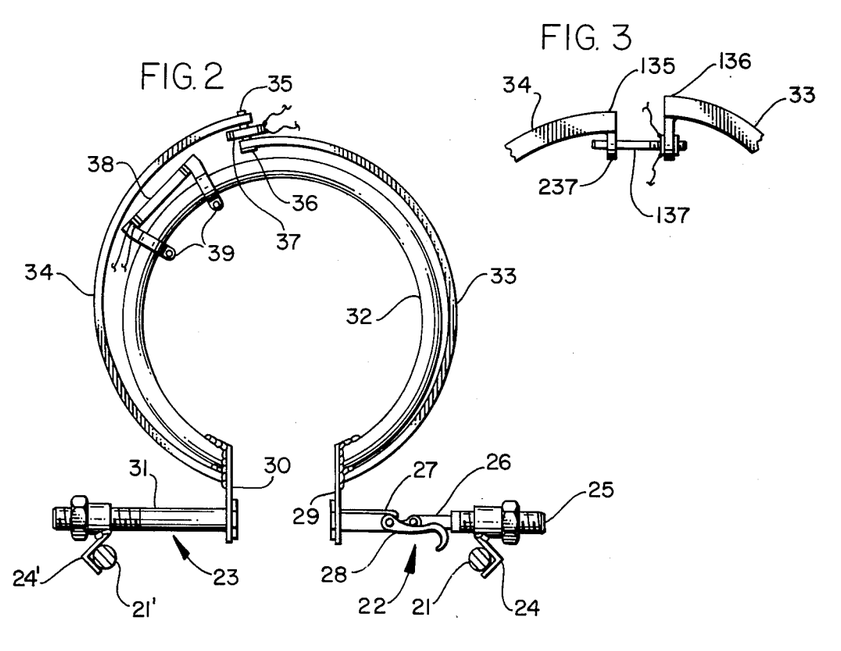
FIG. 2 is an enlarged, detailed, top plan view of a first embodiment of the present invention.
FIG. 3 is a fragmentary representation of a modification of part of the apparatus disclosed in FIG. 2.

In FIG. 2, the bridle is seen to include the usual spaced cables 21, 21' which have been slightly sprung toward one another and connected to the present invention by means of opposed load transfer connectors 22 and 23. The connectors include opposed cable-engaging members 24, 24', which preferably are in the form of a short length of angle iron. The marginal ends of the connectors are threaded at 25 to enable adjustment of the spring force which biases cables 21, 21' toward one another. Connector 22 includes members 26 and 27 which are connected together by means of an over-the-center boomer apparatus which preferably is made similar to a common chain boomer used in securing a load to a flat bed trailer, for example. Handle 28 is moved to lengthen connector 22.

Lateral members 29 and 30 are affixed to connector arm members 27 and 31 and to the terminal ends of a spring member 32. Actuator arms 33 and 34, respectively, are connected to members 29 and 30, respectively; with member 34 terminating at 35 while member 33 terminates at 36.

Signal producing means 37 is mounted to the free ends 35, 36 of actuators 33, 34 so that relative movement between the free ends 35 and 36 generates a signal at 37.

Transducer 38 is directly secured to spring member 31 by means of clamps 39. Slight movement of member 32 occasioned by members 29, 30 being forced apart or toward one another is measured by transducer 38.

FIG. 3 discloses a simplified modification of the apparatus seen in FIG. 2, wherein the free ends 135, 136 of actuators 33, 34 are connected to a ring magnet 237 and a magnetically actuated switch 137 so that relative movement between members 24, 24' causes relative movement between switch 137 and magnet 237, thereby producing a signal.

Figure 4:
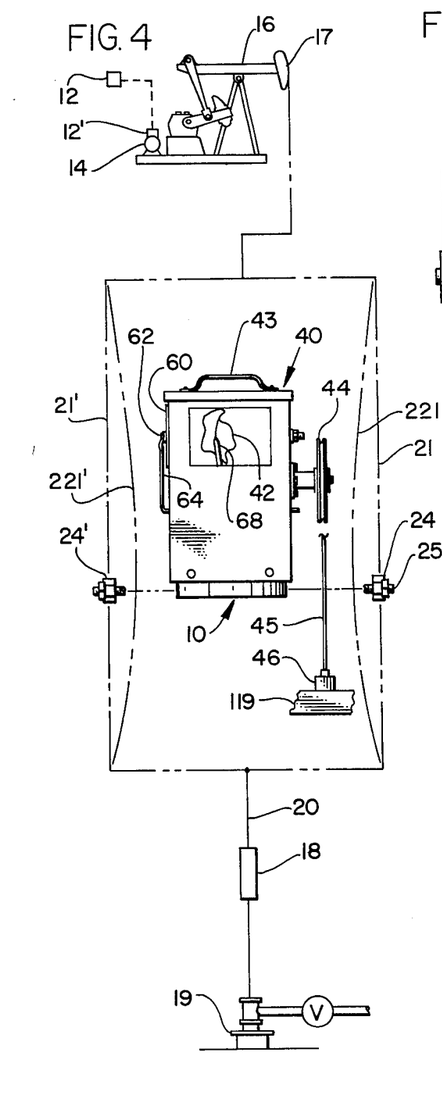
FIG. 4 is a part diagrammatical, part schematical representation of another embodiment of the present invention disclosed in conjunction with a pumpjack unit and a producing oil well.

FIG. 4 is a diagrammatical representation of a pumpjack unit having the present invention associated therewith. The bridle 21, 21' is shown to be connected between the horsehead and the polish rod in a diagrammatical or hypothetical manner. A chart unit, housed within enclosure 40, includes a handle 43 at the upper extremity thereof, and a sensor in the form of a tension measuring spring element at the lower extremity thereof. Hence the enclosure, as well as its contents, is supported from the sensor. Clamp means 24 and 24' extend away from the sensor and are connected to the spaced cables of the bridle in such a manner that the bridle is slightly distorted in accordance with the dot-dash lines 221 and 221'. Accordingly, and change in the tension of the sucker rod string is effected upon polish rod 20, which in turn effects the magnitude with which cables 21 and 21' are biased towards one another.

A window is formed within the enclosure and enables a chart to be viewed therethrough so that any indicia or curve 42 placed upon the chart can be studied through the window.

A pulley 44 is journaled to a chart drive mechanism located within the interior of the housing. Flexible drive line 45 is rove about pulley 44 and has a free depending end attached to a magnet 46, which in turn is magnetically affixed in a removable manner to any suitable metallic structure 119 associated with the pumpjack unit.

Figure 5:
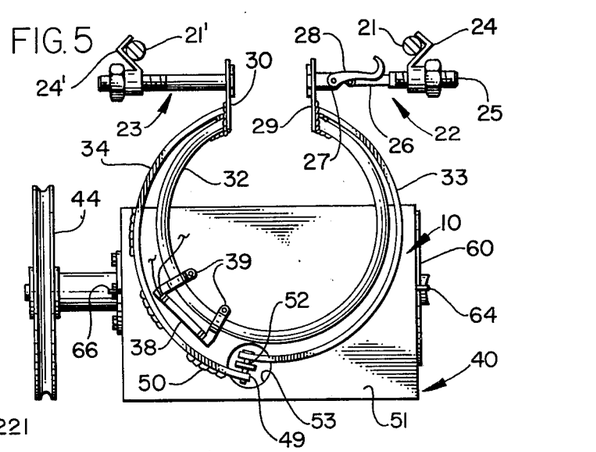
FIG. 5 is an enlarged, bottom view of part of the apparatus disclosed in FIG. 4.
Figure 6:
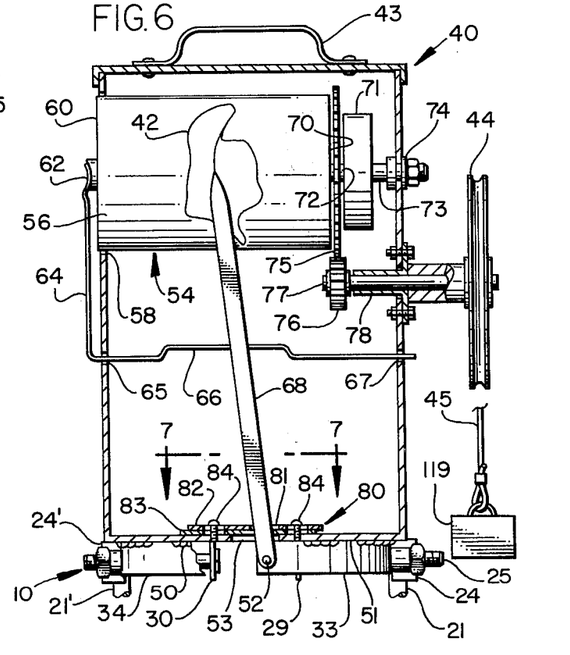
FIG. 6 is a longitudinal, part cross-sectional representation of the apparatus disclosed in FIG. 5.
Figure 7:
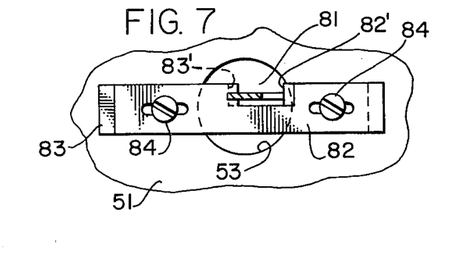
FIG. 7 is a fragmentary, cross-sectional view taken along line 7—7 of FIG. 6.

As seen disclosed in FIGS. 5-7, the fixed end 49 of the actuator 34 is welded as indicated by numeral 50 to the bottom 51 of the enclosure 40. The free end of the actuator arm is journaled at 52 to a scribe 68. The lower marginal end of the scribe is brought through aperture 53, thereby enabling the scribe to extend up into the interior of the enclosure where it provides indicia on the outer surface of drum 54. The surface of the drum is provided with chart paper 56 which can take on any number of different forms. Aperture 58 is formed in a sidewall of the enclosure and rotatably receives the drum therewithin in a manner to maintain proper alignment of end 60 of the drum respective to the remainder of the apparatus. Spring 62 preferably is a resilient rod bent into a configuration to provide a marginal end 64 which is sprung against the drum so as to urge the drum toward the interior of the enclosure. The wire is received through aperture 65 and includes a bent U-shaped portion 66 which engages scribe 68 when portion 64 is rotated away from the end of the drum. The remaining end of the rod is received through aperture 67 formed in a sidewall of the enclosure. End 70 of the drum is driven by shaft 72. Shaft 73 is supported at 74 from a sidewall of the enclosure and carries a spring housing 71. Spring housing 71 contains a spring therewithin which stores energy in response to the string 45 turning pulley 44 in response to the pumping action of the pumpjack. Gear 75 is affixed to a shaft 72 and is driven by a gear 76 so that the line 45 causes the pulley 44 to rotate, thereby to store energy within the spring, whereupon slackening of the line 45 permits the spring to rotatably return the chart drum to its original position.

Figure 8:
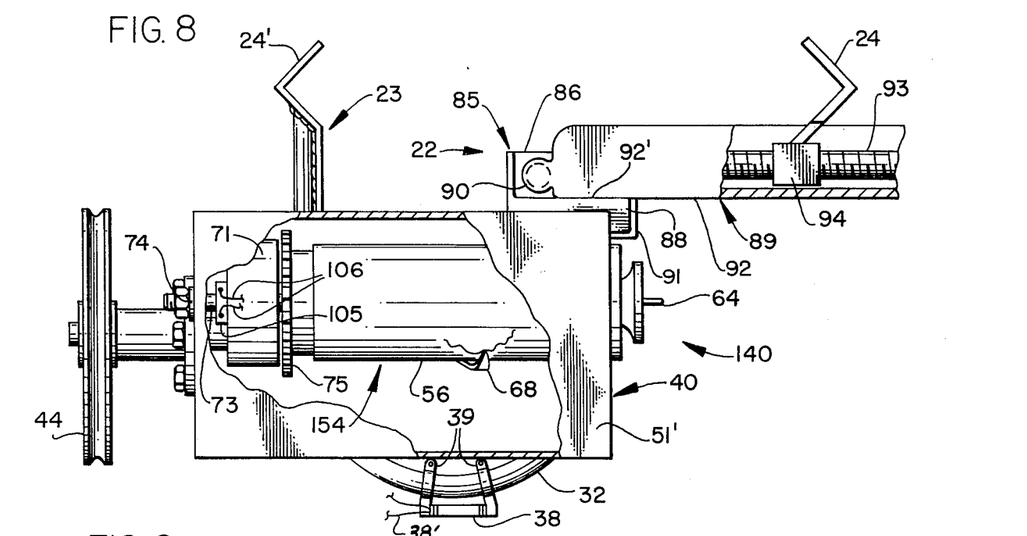
FIG. 8 is a top plan view of still another embodiment of the present invention, with some parts thereof being broken away therefrom in order to better disclose the details thereof.

As best seen illustrated in FIGS. 4, 6, and 8, the pulley is mounted to a sidewall of the enclosure by means of a flanged bushing 78 which rotatably carries a shaft 77 through the axial centerline thereof. The shaft has a gear 76 mounted thereon which drivingly meshes with a larger gear 75.

The scribe has a free indicia forming end portion which engages the chart drum for the purpose of producing the before mentioned curve 42. The scribe includes a medial portion which is engagable with the crank so that when the end of the arm is moved in a pivotal manner away from the end of the cylinder, the free end of the scribe is sprung away from engagement with the surface of the chart drum.

In the embodiment of FIG. 8, the actuator arms 22, 23 are connected to the discontinuous spring in such a manner that part of the arm 22 can be removed from the remainder of the apparatus for ease of storing. The arm 22 includes a support assembly 85 which is attached to the enclosure 140 while arm 23 is affixed to one of the free ends of the spring member 32. Plate member 86 includes an upstanding pin 87 affixed thereto. The plate member continues at 88 to form a stop means against which an elongated arm extension 89 is abuttingly received. The arm extension includes a bushing 90 which is slidably received by the pin 87. Tab 91 extends into underlying relationship respective to the member 88. Sidewall 92 of the arm abuttingly engages sidewall 92' of the support member.

Figure 9:
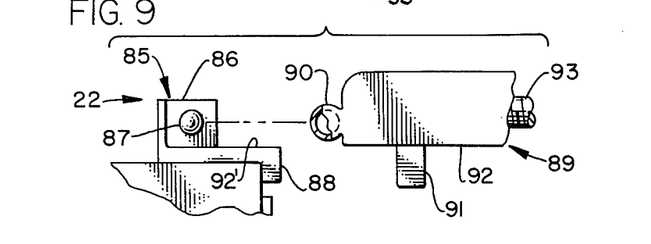
FIG. 9 is a fragmentary, top view of part of the apparatus disclosed in FIG. 8, with some parts being broken away therefrom and some of the remaining parts being shown in cross-section.
Figure 10:
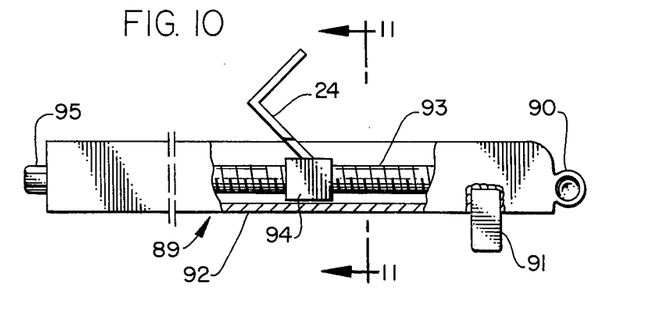
FIG. 10 is a detail of part of the apparatus disclosed in FIGS. 8 and 9, with some parts being broken away therefrom in order to better disclose the invention.
Figure 11:
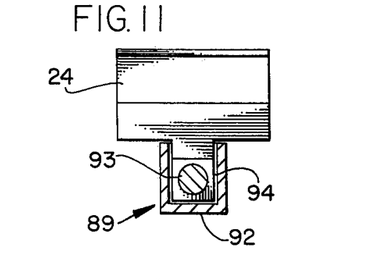
FIG. 11 is a cross-sectional view taken along line 11—11 of FIG. 10.

A rotatable screw 93 threadedly engages block 94 which in turn is affixed to the cable engaging member 24 so that rotation of screw 93 moves member 24 respective to member 24'. As best seen in FIGS. 10 and 11, the screw 93 is journaled to the outermost ends of the arm and is provided with a wrench engaging end portion 95 for adjustment of bridle tension. Accordingly, the extension arm can be pivoted away from the enclosure 40, the arm lifted to remove sleeve 90 from its pin, thereby disassembling the apparatus in the illustrated manner of FIG. 9.

Figure 12:
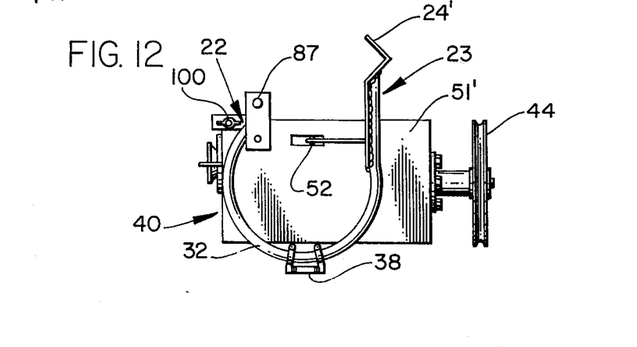
FIG. 12 is a reduced bottom view of the apparatus disclosed in FIG. 8.

As seen in FIG. 12, support assembly 85 is affixed to the enclosure 40, while the member 23 is free to move respective to the enclosure and therefore actuates the scribe at 52 as in the before mentioned embodiments of the invention.

Figure 13:
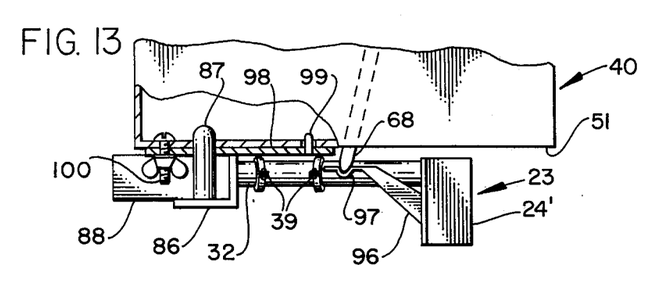
FIG. 13 is a fragmentary representation of a modification of the apparatus disclosed in FIGS. 8-12, with some parts being broken away therefrom in order to more clearly disclose the details thereof.

As best seen in the illustration of FIGS. 12 and 13, arm 24' is connected to the spring member and to a sensor linkage 96 so that the lower end of the scribe 68 is seated within a detent 97. Plate 98 is attached to arm 22 while index pin 99 maintains the discontinuous spring in proper alignment respective to the enclosure member. Fastener means 100 enables the enclosure 40 to be removed from the plate member 98 so that the entire chart drive mechanism can be removed from the sensor device of the present invention.

Figure 14:
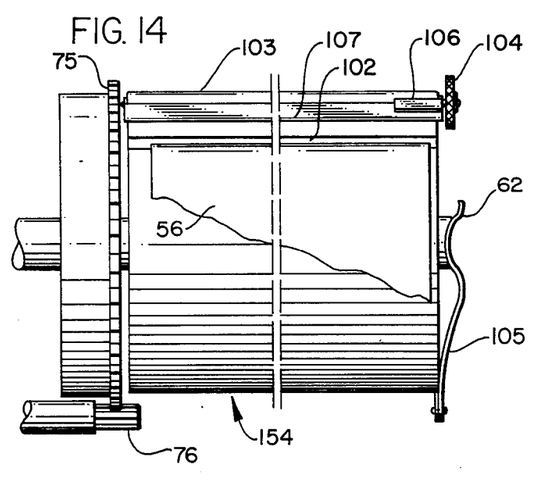
FIG. 14 is an enlarged detail of a modification of part of the apparatus disclosed in the foregoing figures.
Figure 15:
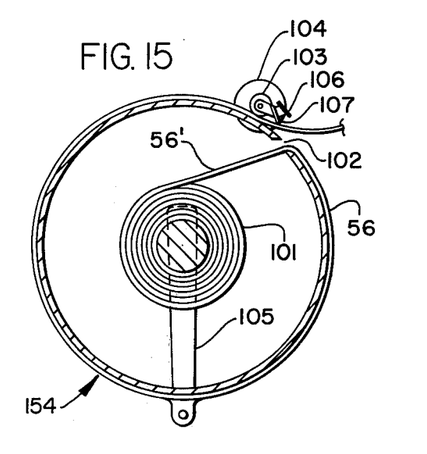
FIG. 15 is a cross-sectional view of the apparatus disclosed in FIG. 14.

In FIGS. 14 and 15, chart paper 101 is contained within a chart drum 154, with the paper being brought through a longitudinal slot 102, rove about the surface of the drum at 56, and back under roller 103 so that the paper can be quickly and easily renewed whenever it is deemed desirable to do so. Knob 104 is affixed to roller 103 and causes the paper to move relative to the face of the drum. Handle 106 actuates cutter 107 so that the free marginal end of the paper can be cut to thereby provide individual lengths of the chart paper for the record.

Figure 16:
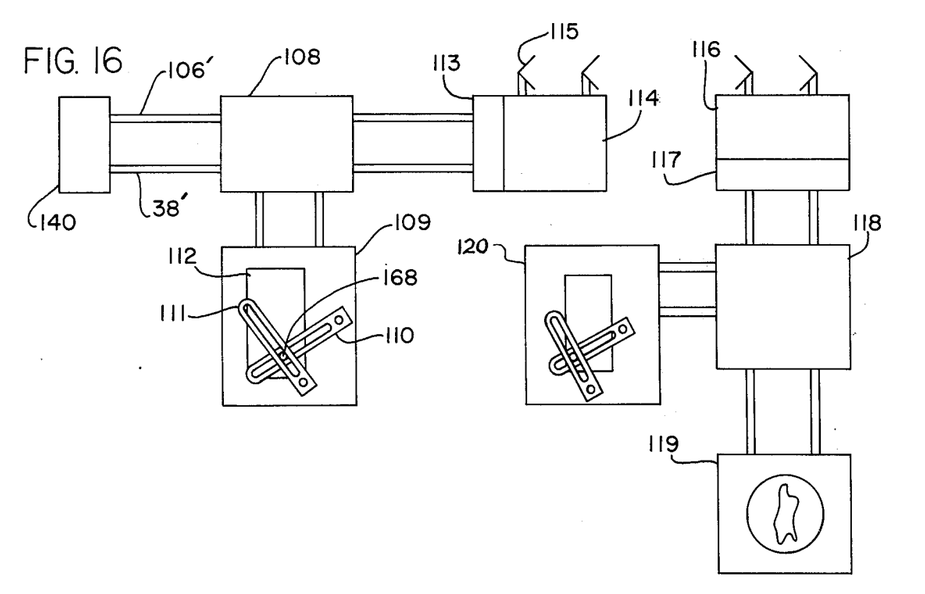
FIG. 16 is a schematical representation of various electronic apparatus which can be used in conjunction with some of the foregoing apparatus.

FIG. 16 is a diagrammatical illustration of an electronic system utilizing the present invention. Numeral 140 indicates the dynamometer of FIG. 8, while numerals 106' are electrical conductors connected to a current amplifier 108. Numeral 38' are electrical conductors which are also connected to the amplifier 108 and to sensor 38. A chart recorder 109 has a pin drive 110 and 111 which moves pen 168 to place indicia upon graph paper 112. The signal at 38' drives arm 111 while the signal at 106' drives arm 110.

Modulator 113 provides transmitter 114 with a signal which is transmitted by antenna system 115.

Receiver 116 is connected to a demodulator 117 and to a current amplifier 118 so that a suitable signal can be received at the visual scope 119 as well as at the recorder 120.

The apparatus 140 of the present invention therefore includes conduits 106' which provide a signal related to the transducer 106 which enables one pen drive arm to be indexed with the vertical position of the sucker rod 20, while the conduits 38' provide a signal related to the sensor 38 which enables the remaining pen drive arm to indicate the tension within the sucker rod. Accordingly, the pen 168 is vertically positioned in accordance with the vertical position of the sucker rod, and is positioned horizontally in proportion to the force with which the bridle is sprung together by spring 32.

Alternatively, transducer 38 or load cell 37 can be utilized for providing the signal at 38'. Moreover, the apparatus of the present invention can be utilized in the manner of FIG. 3 in order to actuate a switch related to the maximum or minimum value of the force with which the bridle is sprung apart.

In operation, the apparatus of the present invention is attached to the bridle of a pumpjack unit, and the tension is adjusted so that the spaced cables of the bridle are slightly deformed in the manner indicated at 221 in FIG. 4. This places the discontinuous spring under a continuous deformation for normal well operation. As the pumpjack reciprocates the polish rod, the cable 45 causes the pulley 44 to rotate, whereupon the gear 76 drives the gear 75, which in turn rotates the chart drum against the spring 71. At the same time, the pumping action produces cyclic changes in the tension of the string of sucker rod which causes a change in the spaced distance between the two parallel cables of the bridle. This change in tension causes the connectors 22 and 23 to move towards and away from one another in opposition to the biasing force of the discontinuous spring. Movement of the connectors cause relative movement between arm 33 and the enclosure 40. The relative movement of the tension transfer members causes the stylus to pivot about the tab assembly 80. The rotational movement of the chart, together with the pivotal movement of the stylus, produces a curve 42 which is representative of the pumping characteristics of the well. Stated differently, the curve 42 provides reproduceable data related to the tension changes measured within the bridle cables each cycle of well operation. As the well continues to reciprocate the downhole pump, the curve will be reproduced or retraced until a pumpoff condition is encountered, whereupon the form of the curve will change in accordance with the well characteristics, which is understood by those skilled in the art of pumpjack dynamometers.

The present invention can be used as a control, as illustrated in FIGS. 2 and 3. The embodiment of FIGS. 4-15 can be used as a conbimation dynamometer and well control.

An important feature of the present invention lies in the use of a plurality of sensors, as seen in FIG. 2, for example, which may be left attached to the pumpjack bridle. The recorder 40 can be affixed to the sensor whenever it is desired to record the well characteristics, thereby gaining a substantial savings in costs, as well as providing a permanent control by which the well is electronically monitored.

As pointed out above, this invention may be used to control the action of the prime mover 14 of a pumpjack unit. In carrying out this aspect of the invention, it is preferred to employ the discontinuous spring and switch assembly of FIG. 2 in conjunction with control circuitry such as disclosed in my previous, U.S. Pat. No. 3,851,955. Those skilled in the art will appreciate that either a switch 137, load cell 37, or transducer 38 can be employed as the sensor device to indicate the pump-off condition in the apparatus disclosed in Pat. No. 3,851,955. When it is deemed desirable to obtain a dynamometer trace of the well characteristics, the enclosure 40, containing the scribe and chart mechanism, can be attached to the apparatus of FIG. 2 and the well monitored until the required data has been recorded.

I claim:

1. Apparatus for measuring tension in a pair of spaced, elongated, parallel members, comprising, in combination, a discontinuous spring member having the distal ends thereof spaced from a midportion, clamp means by which said distal ends are attachable to the elongated members to cause each of said elongated members to be biased out of parallel relationship while said distal ends are springingly moved respective to one another in proportion to movement of said elongated members;

a sensor means connected to sense a change in the magnitude of the sprung relationship of said distal ends respective to one another and to said midportion;

said sensor means includes a scribe mounted to be moved in proportion to relative movement of said distal ends;

and a chart means connected to contact said scribe such that movement of said scribe respective to said chart means provides stored data related to the relative position of said distal ends.

2. The apparatus of claim 1 wherein said spring member is of U-shaped configuration, so that said distal ends are moved away from and towards one another as the tension in said spaced, elongated members increases and decreases.

3. The apparatus of claim 1 and further including a recorder means including a scribe and a chart, means by which said scribe moves relative to said chart to place indicia thereon in response to movement of said distal ends;

means by which said chart can be moved relative to said scribe to thereby provide indicia on said chart which has a vertical and a horizontal component.

4. In combination with a pumpjack unit, apparatus for producing a signal which is related to the tension in the rod string comprising:

a discontinuous spring member having distal ends spaced from a midportion thereof;

clamp means by which said distal ends are attachable to the bridle of the pumpjack unit such that the two elongated cables of the bridle are sprung out of parallel relationship respective to one another, thereby causing relative movement between said distal ends as the tension within the bridle cables change during each stroke of the pumpjack unit;

and a sensor means mounted to sense a change in the sprung relationship of said distal ends.

5. The combination of claim 4 wherein said sensor means includes a stylus mounted to be moved in proportion to relative movement of said distal ends;

and a chart means connected to contact said stylus such that movement of said stylus respective to said chart means provides stored data related to the relative position of said distal ends.

6. The combination of claim 5 wherein said chart means is housed within an enclosure and further includes means by which said chart means is moved respective to said stylus to thereby provide indicia along two different axis.

7. The combination of claim 4 wherein said sensor means is a switch assembly which is moved from a conducting to a non-conducting configuration in response to relative movement of said distal ends.

8. The combination of claim 4 wherein said sensor means includes a transducer, means by which said transducer is connected to provide a signal in response to relative movement of one said distal end respective to said midportion.

9. The apparatus of claim 4 wherein said sensor means includes a scribe;
a chart mounted respective to said scribe to cause indicia to be placed thereon related to tension change in the bridle;
means moving said chart relative to said scribe to cause indicia to be placed on the chart related to the vertical position of the rod string.

10. Dynamometer apparatus connected to measure the change in tension in a string of sucker rod connected to a pumpjack unit by a bridle, comprising in combination:
a discontinuous spring member having distal ends spaced from a midportion thereof;
clamp means by which said distal ends are attachable to the bridle of the pumpjack unit such that the two elongated cables of the bridle are sprung out of parallel relationship respective to one another, thereby causing relative movement between said distal ends as the tension within the bridle cables change during each stroke of the pumpjack unit;
a sensor means mounted to sense a change in the sprung relationship of said distal ends;
said sensor means includes a scribe;
a chart mounted respective to said scribe to cause indicia to be placed thereon related to tension change in the bridle and,
means moving said chart relative to said scribe to cause indicia to be placed on the chart related to the vertical position of the rod string.

11. The apparatus of claim 10 wherein said scribe and said chart are housed within an enclosure and said enclosure includes means by which it is removably affixed to said spring.

12. The apparatus of claim 10 wherein said chart means includes a cylindrical housing which includes journal means by which it is rotatably disposed adjacent to said scribe such that the scribe can place indicia about the outer peripheral surface of said housing;
an elongated longitudinal slot formed in said housing for receiving a strip chart therethrough, whereby a roll of strip chart can be placed within the housing and a marginal end thereof brought through the slot and placed about the outer peripheral surface of the cylindrical housing such that the scribe places indicia on the chart.

13. Apparatus for measuring tension in a pair of spaced, elongated, parallel members, comprising, in combination, a discontinuous spring member having the distal ends thereof spaced from a midportion, clamp means by which said distal ends are attachable to the elongated members to cause each of said elongated members to be biased out of parallel relationship while said distal ends are springingly moved respective to one another in proportion to movement of said elongated members;

a sensor means connected to sense a change in the magnitude of the sprung relationship of said distal ends respective to one another and to said midportion;
said distal ends include arm members extending in opposed relationship to one another;
and a boomer means by which said arms can be effectively shortened so that said clamp means can be quickly affixed to and removed from said elongated members.

14. The apparatus of claim 13 wherein said sensor means includes a stylus mounted to be moved in proportion to relative movement of said distal ends;
and a chart means connected to contact said stylus such that movement of said stylus respective to said chart means provides stored data related to the relative position of said distal ends.

15. The apparatus of claim 14 wherein said chart means is housed within an enclosure and further includes means by which said chart means is moved respective to said stylus to thereby provide indicia along two different axis.

16. The apparatus of claim 13 wherein said sensor means is a switch assembly which is moved from a conducting to a non-conducting configuration in response to relative movement of said distal ends respective to said midportion.

17. The apparatus of claim 13 wherein said sensor means includes a transducer, means by which said transducer is connected to provide a signal in response to relative movement of said distal ends respective to said midportion.

18. The apparatus of claim 13 wherein said spring member is of U-shaped configuration so that said distal ends are moved away from and towards on another as the tension in said spaced, elongated members increases and decreases;
a first arcuate member affixed to one of said distal ends, a second arcuate member affixed to another of said distal ends;
mount means, said first arcuate member being affixed to said mount means, said second arcuate member having a free end portion, said sensor means being connected to sense movement between said mount means and said free end portion of said second arcuate member.

19. The apparatus of claim 13 wherein said distal ends include arm members extending in opposed relationship to one another;
and a boomer means by which said arms can be effectively shortened so that said clamp means can be quickly affixed to and removed from said elongated members.

20. Apparatus for measuring tension in a pair of spaced, elongated, parallel members, comprising, in combination, a discontinuous spring member having the distal ends thereof spaced from a midportion, clamp means by which said distal ends are attachable to the elongated members to cause each of said elongated members to be biased out of parallel relationship while said distal ends are springingly moved respective to one another in proportion to movement of said elongated members;
a sensor means connected to sense a change in the magnitude of the sprung relationship of said distal ends respective to one another and to said midportion;

a recorder means including a scribe and a chart, means by which said scribe moves relative to said chart to place indicia thereon in response to movement of said distal ends; and, means by which said chart can be moved relative to said scribe to thereby provide indicia on said chart which has a vertical and a horizontal component.

21. Apparatus for measuring tension in a pair of spaced, elongated, parallel members, comprising, in combination, a discontinuous spring member having the distal ends thereof spaced from a midportion, clamp means by which said distal ends are attachable to the elongated members to cause each of said elongated members to be biased out of parallel relationship while said distal ends are springingly moved respective to one another in proportion to movement of said elongated members;

a sensor means connected to sense a change in the magnitude of the sprung relationship of said distal ends respective to one another and to said midportion;

said spring member is of U-shaped configuration so that said distal ends are moved away from and towards one another as the tension in spaced, elongated members increases and decreases;

a first arcuate member affixed to one of said distal ends, a second arcuate member affixed to another of said distal ends;

mount means, said first arcuate member being affixed to said mount means, said second arcuate member having a free end portion, said sensor means being connected to sense movement between said mount means and said free end portion of said second arcuate member.

* * * * *

UNITED STATES PATENT OFFICE
CERTIFICATE OF CORRECTION

PATENT NO. : 4,043,191
DATED : August 23, 1977
INVENTOR(S) : Manuel Dee Mills

It is certified that error appears in the above-identified patent and that said Letters Patent are hereby corrected as shown below:

Correct spelling of --DYNAMOMETER-- on the cover sheet and in Column 1, line 1.
Column 4, line 55, "31" should read --32--.
Column 5, line 10, "and" should read --any--.
Column 7, line 54, correct spelling of --combination--.
Column 8, line 37, Claim 3 should read --The apparatus of Claim 13--instead of "The apparatus of Claim 1".
Column 10, line 48, Claim 19 should read --The apparatus of Claim 1--instead of "The apparatus of Claim 13".
Column 12, line 7, insert --said-- after "in".

Signed and Sealed this

Thirteenth Day of December 1977

[SEAL]

Attest:

RUTH C. MASON
*Attesting Officer*

LUTRELLE F. PARKER
*Acting Commissioner of Patents and Trademarks*